United States Patent
Pitzal et al.

(10) Patent No.: US 7,194,997 B2
(45) Date of Patent: Mar. 27, 2007

(54) METHOD FOR MONITORING AN INTERNAL COMBUSTION ENGINE

(75) Inventors: Volker Pitzal, Waldstetten/Wissgoldingen (DE); Gerit Edler Von Schwertfuehrer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 214 days.

(21) Appl. No.: 10/510,292

(22) PCT Filed: Mar. 26, 2003

(86) PCT No.: PCT/DE03/00986

§ 371 (c)(1),
(2), (4) Date: Oct. 6, 2004

(87) PCT Pub. No.: WO03/085249

PCT Pub. Date: Oct. 16, 2003

(65) Prior Publication Data

US 2005/0172930 A1    Aug. 11, 2005

(30) Foreign Application Priority Data

Apr. 8, 2002  (DE) ............................ 102 15 407
Jan. 8, 2003  (DE) ............................ 103 00 194

(51) Int. Cl.
F02D 41/40   (2006.01)
F02D 41/22   (2006.01)
G01M 15/00   (2006.01)

(52) U.S. Cl. .................. 123/299; 73/119 A; 123/478
(58) Field of Classification Search ............... 123/299, 123/357, 478, 480; 73/116, 117.3, 119 A
See application file for complete search history.

(56) References Cited

U.S. PATENT DOCUMENTS

| | | | | |
|---|---|---|---|---|
| 4,594,979 A | * | 6/1986 | Yasuhara | 123/357 |
| 6,298,830 B1 | * | 10/2001 | Kono | 123/478 |
| 6,386,180 B1 | * | 5/2002 | Gerhardt et al. | 123/478 |
| 6,752,126 B2 | * | 6/2004 | Pfaeffle et al. | 123/478 |
| 6,820,473 B2 | * | 11/2004 | Wagner et al. | 73/119 A |

FOREIGN PATENT DOCUMENTS

| | | |
|---|---|---|
| DE | 199 00 740 | 7/2000 |
| DE | 101 23 035 | 1/2002 |
| DE | 102 18 552 | 10/2002 |
| EP | 0 921 296 | 6/1999 |
| EP | 1 103 711 | 5/2001 |
| JP | 2001 193537 | 7/2001 |
| WO | WO 00 73642 | 12/2000 |
| WO | WO 02/12698 | 2/2002 |

OTHER PUBLICATIONS

Patent Abstracts of Japan, vol. 2000, No. 24, May 11, 2001.

* cited by examiner

Primary Examiner—T. M. Argenbright
(74) Attorney, Agent, or Firm—Kenyon & Kenyon LLP

(57) ABSTRACT

A method for monitoring an internal combustion engine is described in which fuel is injected directly into at least one combustion chamber in at least two partial injections via at least one final controlling element, in which an actual torque is determined at least on the basis of one fuel mass that is to be injected and/or has been injected, such actual torque being compared with a permitted torque of the internal combustion engine and an error response being initiated if the actual torque is in a predefined ratio to the permitted torque. A corresponding application of the method for monitoring an internal combustion engine as well as a corresponding device are also described.

13 Claims, 4 Drawing Sheets

METHOD FOR MONITORING AN INTERNAL COMBUSTION ENGINE

FIELD OF THE INVENTION

The invention relates to a method for monitoring an internal combustion engine in which fuel is injected directly into at least one combustion chamber in at least two partial amounts via at least one final controlling element, in which, at least on the basis of a fuel mass injected and/or to be injected, an actual torque of the internal combustion engine is determined, such actual torque then being compared with a permissible torque of the internal combustion engine, and an error response being initiated when the actual torque is in a predefined ratio to the permissible torque.

The invention further relates to a corresponding application of the method for monitoring an internal combustion engine as well as a corresponding device.

DESCRIPTION OF RELATED ART

Modern internal combustion engines are equipped with engine controllers which control the power output and torque of the internal combustion engine by regulating particular parameters as a function of input variables. Multiple monitoring measures to ensure the safe operation and the availability of the internal combustion engine must be provided to prevent malfunctions, in particular malfunctions of the electronic control unit for the engine controller.

DE 199 00 740 [[A1]] introduces a method and a device for operating an internal combustion engine which is operated using a lean air/fuel blend under certain operating conditions. The fuel mass to be injected, and/or the injection time to be used is determined on the basis of a setpoint value. In order to monitor operability, the actual torque of the internal combustion engine is determined on the basis of the fuel mass to be injected and/or the injection time which has been or is to be determined, compared with a maximum permissible torque, and an error response is initiated if the actual torque exceeds the maximum permissible torque. According to DE 199 00 740 A1, the fuel mass to be injected is determined on the basis of the injection time, which is transmitted from the controller, and possibly additional variables such as the fuel pressure. The fuel mass thus determined is converted to a transmitted engine torque which is corrected taking into account efficiencies such as, for example, the injection time efficiency. At the same time, a variable representing the oxygen concentration in the exhaust gas is compared with at least one predefined threshold value and an error response is initiated if it exceeds the threshold value.

DE 101 23 035.4 (not a prior publication) discloses an internal combustion engine in which fuel metering may be divided into at least one first partial injection and a second partial injection. During the second partial injection, a fuel quantity variable, which characterizes the fuel quantity that is injected during the second partial injection, is corrected on the basis of at least one pressure variable, which characterizes the fuel pressure, the fuel quantity variable, and at least one additional variable.

SUMMARY OF THE INVENTION

The object of the present invention is to provide a method for monitoring the torque of an internal combustion engine according to which fuel metering is divided into at least one first partial injection and a second partial injection.

The object is achieved by a method for monitoring an internal combustion engine in which fuel is injected directly into at least one combustion chamber in at least two partial injections via at least one final controlling element, in which an actual torque of the internal combustion engine is determined at least on the basis of a fuel mass injected and/or to be injected, such actual torque is then compared with a permissible torque of the internal combustion engine, and an error response is initiated if the actual torque is in a predefined ratio to the permissible torque, and in which a total fuel volume of all partial injections is taken into account for the determination of the fuel mass that has been and/or is to be injected.

This measure according to the present invention provides a highly advantageous method for torque monitoring which takes into account multiple partial injections and may be applied in any operating situation.

A fuel volume of a partial injection is advantageously determined at least on the basis of an actuation period of the final controlling element in question and a pressure acting on the fuel. A variable defining the actuation start may be considered instead of or in addition to such pressure. This may be performed, for example, via a characteristic map that is stored in the control device of the internal combustion engine and applied specifically to the partial injection to which it relates. If the final controlling element is designed as an injector, the corresponding fuel volume value is derived from the characteristic map on the basis of input variables including the actuation time of the injector in question and the pressure acting on the fuel (in common rail internal combustion engines, this is the rail pressure in the common rail). If the final controlling element configured as a unit injector system or a unit pump system, the actuation start is used instead of the pressure.

The total fuel volume of a combustion cycle may then be determined from the sum total of the fuel volume of all partial injections. Based on this total fuel volume, a fuel mass may be determined via a known fuel density.

An advantageous refinement of the present invention provides that the determined fuel volume of a partial injection is corrected depending on an actuation start of the injector in question. Such correction is advantageously done using a correction factor that is derived from an injection efficiency characteristic map which is a function of the actuation start. This refinement offers the great advantage of considering the possibly non-linear correlation between the actuation start of the injector and the attained torque effect achieved. In view of the current state of development of modern internal combustion engines having exhaust aftertreatment systems this is a beneficial approach, for in such engines a modified actuation start does not necessarily influence the torque generated by the internal combustion engine but may merely cause a rise in the temperature of the exhaust gas.

According to a particularly advantageous refinement of the present invention, the previously determined fuel mass is linked to a wave correction mass to yield a corrected fuel mass. This may be achieved, for example, by subtracting the wave correction mass from the previously measured fuel mass. This correction provides a highly advantageous method for taking into account wave phenomena that might occur in a high pressure injection system such as a common rail system, in the feed line from the fuel reservoir to the injector, and influence the fuel mass injected during the injector actuation time. The wave correction mass is advantageously determined on the basis of at least the fuel volume of the partial injections and the pressure acting on the fuel.

A torque of the internal combustion engine is determined from the fuel mass that has been corrected in the manner described above together with a rotational speed of the internal combustion engine. This is advantageously performed via a characteristic map that is stored in the engine controller. It is also possible to include other influencing parameters besides the rotational speed of the internal combustion engine. According to the present invention, the determined torque of the internal combustion engine is linked to an efficiency correction factor to produce a corrected torque of the internal combustion engine. This efficiency correction factor particularly advantageously considers influencing parameters such as the temperature of the internal combustion engine, engine friction, oil temperature and oil quality.

The error response is then advantageously initiated if the actual torque is greater than the permissible torque.

A further advantage is provided by the use of the monitoring method according to the present invention for monitoring a direct injection diesel engine, in particular one having a common-rail system and/or a unit injector system or a unit pump system.

DETAILED DESCRIPTION OF THE INVENTION

Figure 1:
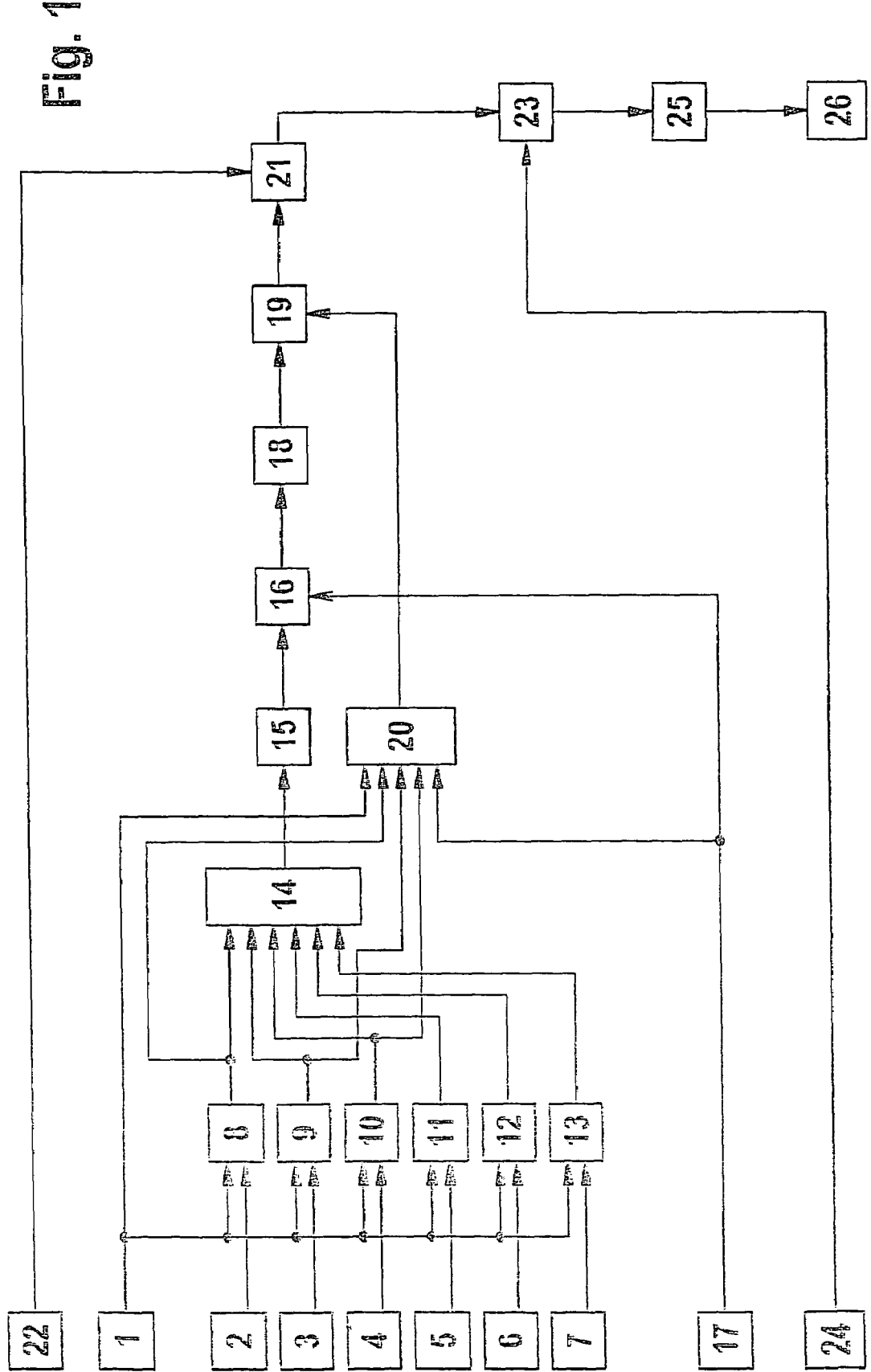
FIG. 1 shows a first exemplary embodiment of the method according to the present invention.

FIG. 1 shows a first exemplary embodiment of the method according to the present invention for monitoring an internal combustion engine. The object of the method described in FIG. 1 is to determine an actual torque, which is compared with a permissible torque. The method described in FIG. 1, which normally runs in the engine controller of an internal combustion engine, assumes that certain input variables have been previously stored in the engine controller. These input variables are identified in FIG. 1 by reference numbers 1 through 7, 17, 22 and 24.

The exemplary embodiment represented in FIG. 1 is described on the basis of various injection modes, such as are normally used in direct injection diesel engines. However, the method according to the present invention is not limited to diesel engines; it can be applied in principle to any direct injection internal combustion engine having multiple injection modes.

The direct injection diesel engine that is monitored by the method according to FIG. 1 is a common rail diesel engine in which the fuel for injections is available in a shared fuel distributor, the common rail. From the common rail, where the fuel is under high pressure, the fuel travels through normally short, high-pressure feed lines to the injectors, which inject the fuel directly into the combustion chambers of the engine. The pressurized fuel available in the common rail allows various fuel injection modes to be used for injecting fuel into the same combustion chamber. These various injection modes may be pilot injection, main injection, or post-injection.

Reference number 1 in the method described in FIG. 1 refers to instantaneous rail pressure p. Reference number 2 refers to the actuation period of an injector for a main injection ti_Main. This main injection generates most of the torque of the internal combustion engine. Reference number 3 refers to the actuation period of the injector for a first pilot injection ti_Pilot1. This first pilot injection may be initiated, for example, when the crankshaft is at an angle 10 to 20 degrees prior to the main injection and its main effect besides generating torque is to reduce the running noise of the engine. Reference number 4 refers to the actuation period of a second pilot injection ti_Pilot2. This second pilot injection may help reduce the running noise of the internal combustion engine but in conjunction with the first pilot injection, for example may also improve exhaust gas values. Reference number 5 refers to a third pilot injection ti_Pilot3, for example, which may be injected into the combustion chamber well before any of the other injections, thereby significantly increasing torque. Reference number 6 refers to the actuation time of the injector for a first post-injection ti_Post1, and reference number 7 refers to the injector actuation time of a second post-injection ti_Post2. Both post-injections are primarily used to lower exhaust emissions and possibly to clean an $N_{ox}$ accumulator-type catalytic converter or particle filter.

Rail pressure p according to reference number 1 and the injector actuation time for main injection ti_Main, referred to by reference number 2, are supplied to a characteristic map Main (reference number 8). Depending on the actuation time supplied and the rail pressure p, the output from characteristic map Main (reference number 8) is a fuel volume of the main injection, which is supplied to a summer 14. The instantaneous rail pressure p, referred to by reference number 1, and the corresponding injector actuation times expressed as reference numbers 3 (ti_Pilot1), 4 (ti_Pilot2), 5 (ti_Pilot3), 6 (ti_Post1) and 7 (ti_Post2) are supplied to the characteristic maps Pilot1 (reference number 9), Pilot2 (reference number 10), Pilot3 (reference number 11), Post1 (reference number 12), and Post2 (reference number 13). The result is a fuel volume in each case, similar to the characteristic map 8, which is also supplied to summer 14. At point 15, summer 14 provides, as a result, the total fuel volume introduced into a combustion chamber throughout a combustion cycle via the injector using various injection modes.

This fuel volume is then supplied to a node 16, which also receives the signal regarding fuel density rho from signal block 17. The linkage, i.e., multiplication of the fuel volume by fuel density rho 17 yields fuel mass 18.

Fuel mass 18 is supplied to a subtractor 19, which has the output signal from a signal block 20 as a further input signal. A wave correction fuel mass is determined in signal block 20 and is used to compensate for waves arising in the high pressure line between the common rail and the associated injector, which occur when multiple injection modes are executed in rapid succession. When several injections are executed in rapid succession, the fuel in the high pressure line may not have fully settled by the time the next injection occurs. This condition causes the physical phenomenon of a standing wave in the high-pressure line. The input variables applied to wave correction according to block 20 are instantaneous rail pressure p from block 1, fuel density rho from block 17, and the output signals from characteristic maps 8, 9 and 10, on the basis of which the fuel volumes for the main injection as well as the first and second post-injections are supplied to wave correction block 20. The way in which the wave correction fuel mass is determined in block 20 will be described in the explanation of FIG. 2 below.

As indicated previously, the output signal from wave correction block 20 is supplied to subtractor 19. The subtractor subtracts the wave correction fuel mass from the previously determined fuel mass 18. The resulting corrected fuel mass is supplied to a torque characteristic map 21. Torque characteristic map 21 also receives rotational speed n of the internal combustion engine from block 22. The output variable from the supplied corrected fuel mass and rotational speed n is the torque of the internal combustion engine.

This determined torque of the internal combustion engine is supplied to node 23. Node 23 also receives the signal from block 24. The signal from block 24 is an efficiency factor that is present in the engine controller. This efficiency factor takes into account certain variables including the temperature of the engine, the engine friction, the oil temperature, the oil quality and, where applicable, other influencing parameters. Efficiency factor 24 is multiplied by the previously determined torque of the internal combustion engine in node 23. The output from node 23 is the calculated actual internal torque of the internal combustion engine.

This actual torque 25 is supplied to a comparison routine 26, in which the previously determined actual internal torque is compared with a maximum permitted internal torque of the internal combustion engine. If it is determined that the actual internal torque is greater than the permitted torque of the internal combustion engine, an error response is initiated. Such an error response might be, for example, a safety cut-off of the fuel supply or limiting the rotational speed of the internal combustion engine. Limiting the rotational speed is preferred to possibly limiting the torque because the rotational speed is easier to monitor. Other error responses might include making an entry in an error log, displaying an error message to the operator of the vehicle or re-starting the engine controller.

Determining permitted torque is known to those skilled in the art and may be calculated, for example, according to the monitor concept via a redundant torque path in the engine controller. One of the variables influencing the permitted torque is, for example, the operation of the gas pedal.

Figure 2:
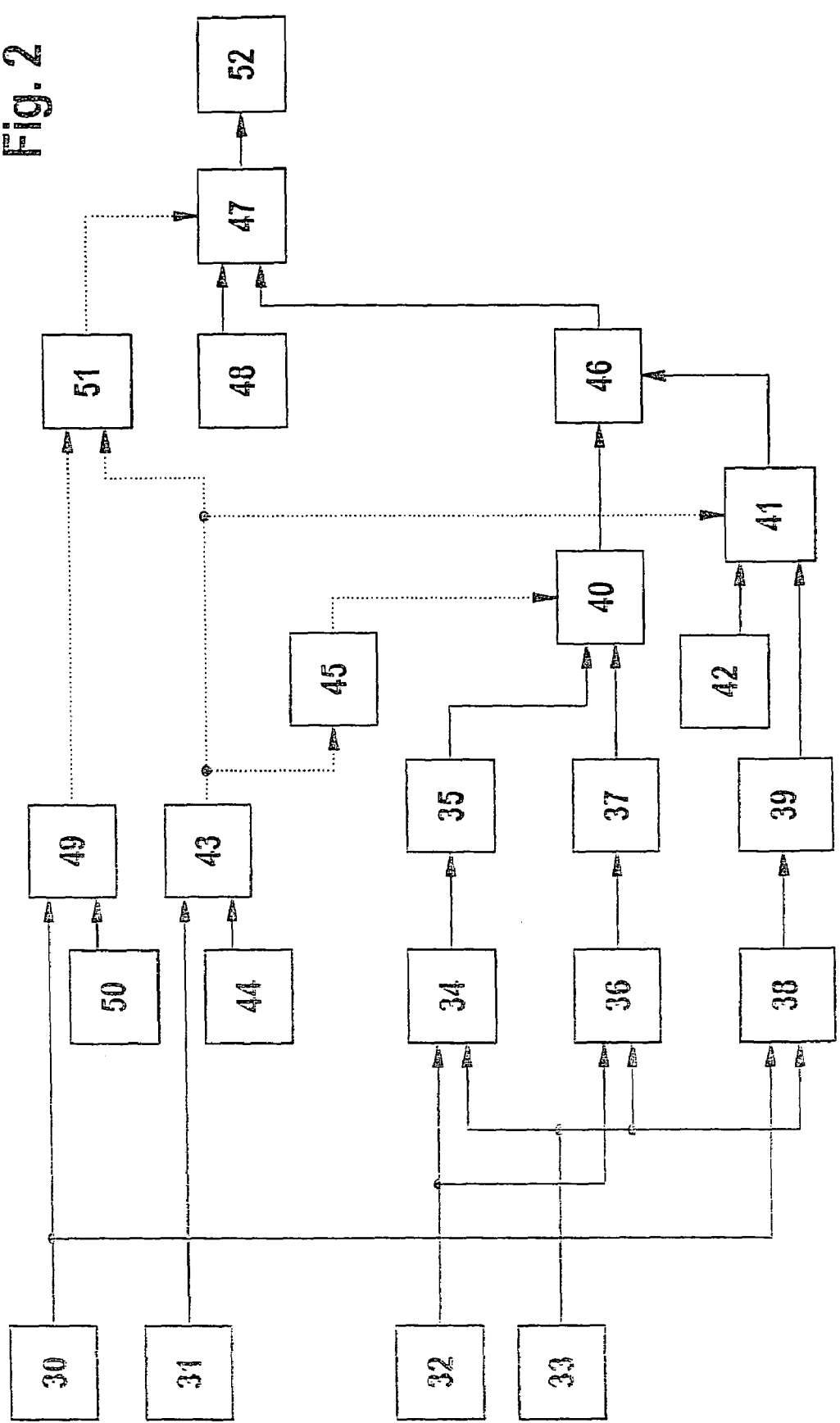
FIG. 2 shows a detail of the first exemplary embodiment.

FIG. 2 shows in detail wave correction block 20, as was shown previously in the description of FIG. 1. As was indicated in the description of FIG. 1, the fuel volume of first pilot injection Pilot1 (reference number 30), the fuel volume of second pilot injection Pilot2 (reference number 31), instantaneous rail pressure p (reference number 32), the fuel volume of main injection Main (reference number 33) and density rho of the fuel used (reference number 17) are supplied to the wave correction block as inputs. From the supplied fuel volumes (30, 31 and 33) and supplied fuel density rho (17), the wave correction block first determines the pertinent fuel mass in signal blocks 30, 31 and 33, that fuel mass then being available as an output signal from each of blocks 30, 31 and 33. FIG. 2 does not show the associated linkages with fuel density rho since there is an option to supply the determined fuel masses directly to the wave correction block. With reference to the drawing in FIG. 1, this procedure would require that after each individual fuel volume has been determined, it be converted to individual fuel masses before the individual fuel masses are combined in a summer (corresponds to block 14 in FIG. 1) to yield a total fuel mass. In this case, each individual fuel mass would immediately be available as a signal. The final decision on which method to use will depend on the selection of those skilled in the art based on various influencing parameters, such as the runtime values of the controller.

Instantaneous rail pressure 32 and the fuel mass of main injection 33 are supplied to a first quantity correction characteristic map 34 as input variables. The result from quantity correction characteristic map 34 is a first corrected quantity 35. The same input variables as were supplied to quantity correction characteristic map 34 are also supplied as inputs to a quantity correction characteristic map 36. The result from second quantity correction characteristic map 36 is a second corrected quantity 37. The fuel mass of main injection 33 and the fuel mass of first pilot injection 30 are supplied as input variables to a third quantity correction characteristic map 38. The result from this third quantity correction characteristic map is a third corrected quantity 39. First corrected quantity 35 and second corrected quantity 37 are supplied to a first selector block 40. Third corrected quantity 39 is supplied to a second selector block 41. Second selector block 41 also receives a preset factor 42 as an input variable, which in this embodiment is set to zero. In other words, the output variable from first selector block 1 is either first corrected quantity 35 or second corrected quantity 37, and the output value from second selector block 41 is either third corrected quantity 39 or preset value 42 (=0).

The fuel mass of second pilot injection 31 is supplied to a first input of a first query logic circuit 43, which then returns a "High Level" as the output value when the first input value received by query logic circuit 43 is greater than the second input value. A second preset value 44, zero in this exemplary embodiment, is supplied to first query logic circuit 43 as a second input value. First query logic circuit 43 functions in such a way that the result of query logic circuit 43 indicates "High Level" if fuel mass variable 31 is present. If the value for fuel mass 31 is absent, the output value from query logic circuit 43 is "Low Level".

The fuel mass of first pilot injection 30 is supplied to a first input of a second query logic circuit 49, which then returns a "High Level" as the output value when the first input value received by query logic circuit 49 is greater than the second input value. A fourth preset value 50, which is set to zero in this embodiment, is supplied to second query logic circuit 49 as a second input value. Second query logic circuit 49 functions in such a way that the result of query logic circuit 49 indicates a "High Level" if fuel mass value 30 is present. If the value for fuel mass 30 is absent, the output value from query logic circuit 49 is "Low Level."

The output signal from first query logic circuit 43 is supplied to a NOT gate 45. The output value from NOT gate 45 is supplied to a gate input of first selector gate 40. When first selector gate 40 is in a neutral position (for a "Low Level" signal at the gate input), it sends a signal of first correction quantity to block 35 as the output value from first selector gate 40. On the other hand, if a "High Level" is at the gate input, second corrected quantity 37 is output as the output variable from first selector gate 40. The output value from first selector gate 40 is supplied to a summer 46.

The output signal from second query logic circuit 49 is supplied to an input gate of second selector gate 41. When second selector gate 41 is in a neutral position (for a "Low Level" signal at the gate input), it sends a signal of first preset value (in this case zero) to block 42 as the output value from second selector gate 41. On the other hand, if a "High Level" is at the gate input, third corrected quantity 39 is output as the output variable from second selector block 41. The output value from second selector gate 41 is also supplied to summer 46.

The output signals from query logic circuits 43 and 49 are also supplied to an OR gate 51, which has "High Level" as the output signal if an output signal from query logic circuits 43 and 49 also indicate "High Signal". If only "Low Signals" are present at the input of OR gate 51, the output of OR gate 51 will also return only a "Low Signal."

The output signal from summer 46 is supplied to a third selector block 47, which also receives a third preset value 48 as an additional input value, set to zero in this embodiment. The output signal from OR gate 51 is supplied to the input of third selector block 47. When third selector gate 47 is in a neutral position (for a "Low Level" signal at the gate input), it returns the signal of the third preset value (i.e. zero) to block 48 as the output value from third selector gate 47. On the other hand, if a "High Level" is at the gate input, the output value from summer 46 is output as the output variable from third selector block 47.

The output signal from third selector block 47 is supplied to an output signal block 52 and represents the desired wave correction quantity that is used in the configuration according to FIG. 1.

Figure 3:
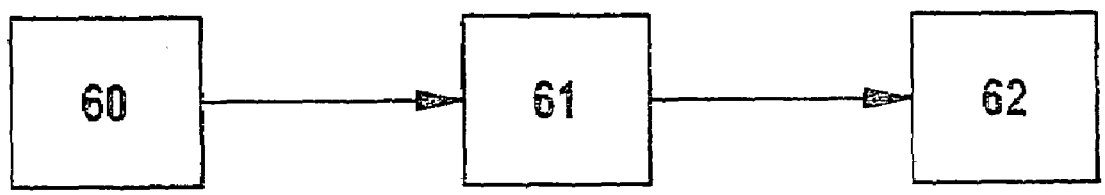
FIG. 3 shows a possible extension of the first exemplary embodiment.

FIG. 3 shows a possible extension of the first embodiment in FIG. 1. In modern diesel engines equipped with exhaust aftertreatment systems, it may happen that the injector actuation period and in particular the actuation start may be modified so that they do not affect the torque. Theoretically, this condition may occur during all injection modes described earlier. In such cases, the start and duration of fuel injection actuation do not return an unequivocal analysis of the generated torques. For example, it is possible to retard the actuation start of the main injection from a few degrees before top dead center to a few degrees after top dead center to regenerate an exhaust aftertreatment system. This delay of the injection start does not affect the torque and results merely in an elevated combustion temperature which assists in the regeneration of the exhaust aftertreatment system. In these instances it is thus necessary to consider the effectiveness of the actuation start and duration. This is accomplished by the method described in the embodiment in FIG. 3. Actuation start 60 is supplied to an effectiveness characteristic map 61. This effectiveness characteristic map 61 must be stored individually for each injection mode in the engine controller. The output value from the effectiveness characteristic map is a correction factor 62 which enables the determined fuel volumes as output variables of blocks 8, 9, 10, 12 and 13 according to FIG. 1 to be corrected. For example, it might be possible to extend the main injection by factor 2 while retarding the actuation start, as described earlier, from a few degrees before TDC to a few degrees after TDC. This modification to the main injection would have no impact on the torques which would necessitate the use of the correction factor 0.5, since the doubled fuel volume only results in the same torque. Also, an additional effectiveness characteristic map may be used for the injection duration, or a combined effectiveness characteristic map for the injection start and duration might be used.

A further refinement of the method according to the present invention provides for a plausibility check of the fuel mass determined as shown in the exemplary embodiment of FIG. 1. This may be assured, for example, by combining a lambda sensor value with the signal from a hot film air mass flow meter and the rotational speed while measuring the exhaust feedback rate. In this way, a second, independent fuel mass variable can be determined. This in turn enables the mass of fuel actually injected to be calculated precisely within reasonable tolerances, thereby providing an average injected fuel mass derived from independent variables which may be used in a plausibility check of the fuel mass derived from the actuation data.

In summary, the monitoring method according to the present invention provides a capability for continuous monitoring of torques throughout the entire speed range of the internal combustion engine. This increases the safety of the overall system and assures improved error response.

In the context of this application, the comparison of torques was described on the basis of internal torques of the internal combustion engine. Nevertheless, the invention may be used for any given torque provided the torques are comparable.

The input data according to FIG. 1 is advantageously determined synchronously with the rotational speed. This measurement is carried out by the controller (not shown in the figures) of the internal combustion engine which is not included in the scope of this application.

The device according to the present invention is an internal combustion engine having a controller capable of performing the method according to the present invention.

Besides the common rail systems, in which pressure buildup is initiated by the controller and, at the end of fuel metering, separated therefrom other systems are also known in which pressure buildup and the control of fuel metering are closely linked. These systems also require monitoring of the control unit such as is provided by the present invention. This applies in particular to the unit injector systems and/or unit pump systems. In general, the method described herein may be used for all fuel metering systems in which the start and end of fuel metering are modified via a final controlling element. The actuation start of this final controlling element generally determines the start of fuel metering, and the actuation end is defined by the end of fuel metering. The period between the actuation start and finish is again defined by the quantity of fuel to be injected.

Normally, the unit injector systems carry out only one main injection, one pilot injection and one post-injection. In theory, additional injections are also possible. In the following, this method will be described with reference to the example of the first pilot injection and the second post-injection. According to the present invention, this procedure may be applied to the other injection modes and/or to more or fewer partial injections.

In the method described in the foregoing, with a common rail system, the essential influencing parameters are the fuel amount to be injected, the actuation time and the rail pressure. These variables are considered via the corresponding characteristic maps. Additional variables may also be taken into account, such as for example, rotational speed, fuel density, and/or temperature variations. In contrast to the foregoing, the present invention recognized that in a unit injector system, or a unit pump system, or generally in a system in which the pressure buildup is not decoupled from the fuel metering, the essential influencing variables on the fuel quantity are the actuation start and duration. The rotational speed, temperature, and/or the fuel density may also be taken into account in addition to these variables. Other variables that characterize the actuation start may also be used instead of the actuation start. In particular, a feed start signal may be used.

Using these variables, a default fuel mass QKV, also known as the virtual fuel mass, is set. Using this virtual fuel mass QKV as a reference, the actual torque is determined by torque characteristic map 21 as shown in FIG. 1 and the plausibility check is performed on that basis.

Figure 4:
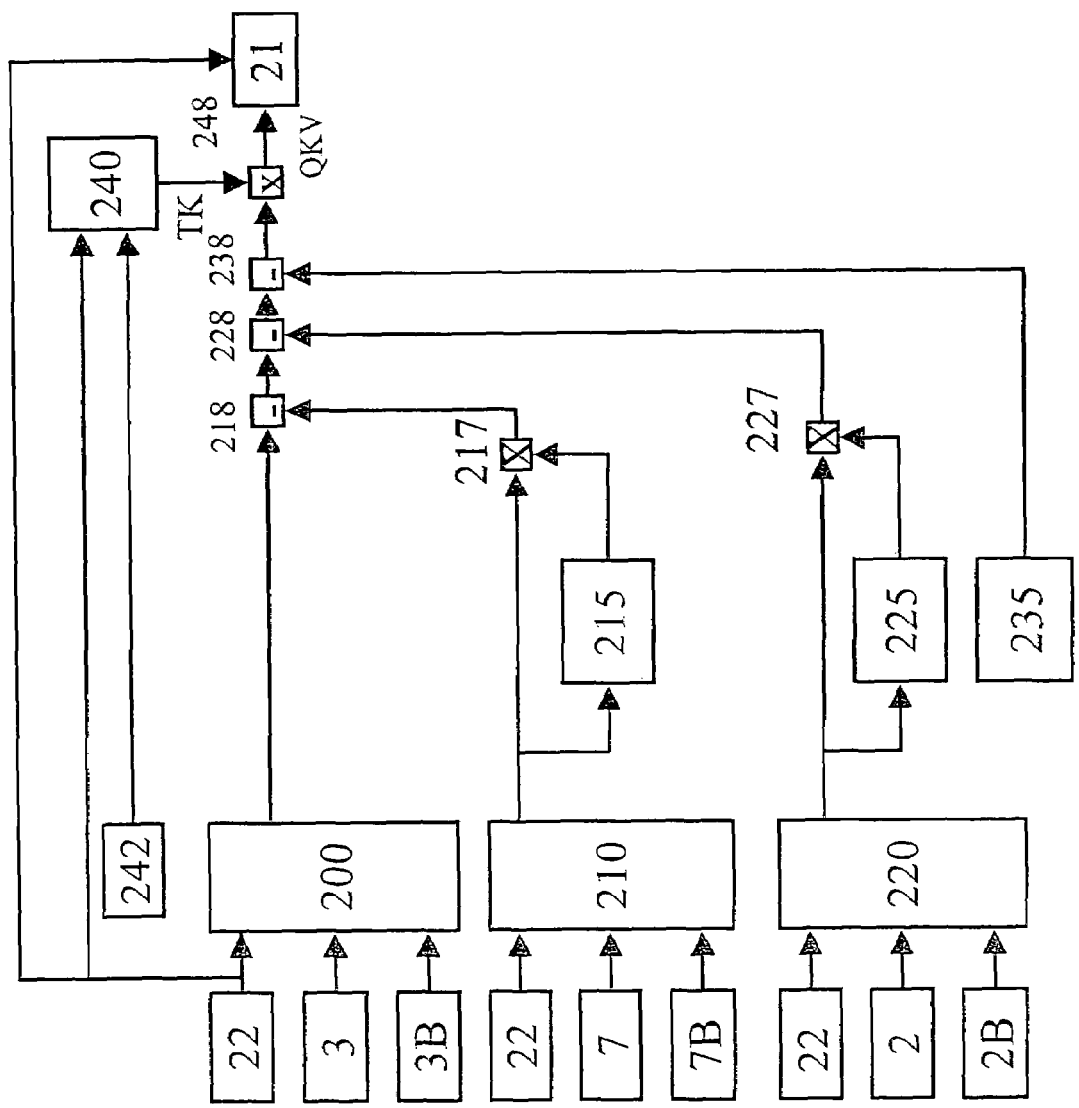
FIG. 4 shows a second exemplary embodiment of the method according to the present invention.

The method is described in greater detail in FIG. 4. Elements that were described in the earlier figures are designated with the same reference numbers. Besides rotational speed 22, the actuation time for the main injection ti-Main, for the first pilot injection ti_Pilot1, and for the second post-injection ti_Post2, the corresponding actuation starts are also required.

Actuation start FB_Main for the main injection has reference number 3B. This variable is supplied to a first mass calculation unit 200 together with rotational speed N and the actuation time ti_Main of the main injection.

Actuation start FB_Pilot1 for the first pilot injection has reference number 7B. Actuation start FB_Pilot1, actuation time ti_Pilot1 of the first pilot injection and the engine speed are supplied to a second mass calculation unit 210.

Actuation start FB_Post2 of a second post-injection has reference number 2B and is supplied to a third mass calculation unit 220 together with actuation time ti_Post2 and a rotational speed N.

The first, second, and third mass calculation units store the fuel mass of the corresponding partial injections, depending on the rotational speed, actuation time and the associated actuation start. In a simple design, a three-dimensional characteristic map is provided for this purpose. Such a three-dimensional characteristic map may be implemented for example via several two-dimensional characteristic maps or curves. In one embodiment, it is further possible to provide that the calculation be made via appropriate functions instead of a characteristic map, based on the described input variables. In this case, the characteristic map may be advantageously approximated with an nth degree polynomial.

The output signal from second mass calculation unit 210 is supplied both to a first mass correction unit 215 and to a node 217. Similarly, the output signal from the third mass calculation unit is passed to a second mass correction unit 225 and a second node 227. The first and second mass correction units, 215 and 225 respectively, each store a correction factor which is used to correct the output variable from the second mass calculation unit and the third mass calculation unit respectively in such a way that the mass signals incident at each of nodes 217, and 227 correspond to the fuel mass that will deliver a contribution to the torque. This is necessary because the fuel quantities during pilot injection and post-injection have less effect than those of the main injection. Consequently, larger fuel amounts must be injected during the pre- and post-injections than during main injection in order to achieve the same torque. This effect is taken into account by mass correction units 215 and 225.

It is further possible to provide for the injection of additional fuel for the exhaust aftertreatment system. This fuel may be used to condition the exhaust aftertreatment system, such as a particle filter, and/or an oxidation catalytic converter. This fuel mass is calculated by exhaust gas correction unit 235.

The individual output signals from first mass calculation unit 200, the node 217, node 227 and possibly exhaust gas correction unit 225 are totaled in nodes 218, 228 and 238. This means that there is a virtual fuel mass available at output from node 238 that corresponds to the fuel mass which should have been apportioned in the main injection to produce a given torque.

In node 248, the output signal from node 238 is combined with output signal TK from temperature correction unit 240. A signal from temperature sensor 242 is supplied to temperature correction unit 240. Other signals, such as rotational speed N, may be considered in addition to this signal. Based on the temperature, a factor is determined which takes into account the effect of the fuel temperature on the fuel mass.

As an alternative to the described method, the individual output signals from the mass calculation units may be corrected accordingly. It is possible to use multiple correction factors for the various partial injections.

The virtual fuel mass signal after temperature correction is then transmitted to torque characteristic map 21, as shown in FIG. 1. This method presents an advantage since there are certain systems in which pressure buildup is not decoupled from fuel metering, and the injected fuel amount depends primarily on the injection actuation start angle. This dependency is not the case in common rail systems. In these systems, only the torque that is produced by a given quantity of fuel is dependent on the actuation start. In this case, the fuel mass depends on the actuation start to a much greater degree than in coupled systems.

In the method described in FIG. 1, the fuel temperature is included in the calculation of the fuel mass, based on the volume. This is normally taken into account via the fuel density. In unit injector systems, or coupled systems, the fuel temperature has a much greater influence and as such is taken into account via a separate correction factor.

The particular advantage of this method is that the characteristic maps used are often also used to control the fuel injection.

What is claimed is:

1. A method for monitoring an internal combustion engine, in which fuel is injected directly into at least one combustion chamber in at least two partial injections, using at least one final controlling element, comprising determining an actual torque of the internal combustion engine based on at least one injected fuel mass or one fuel mass to be injected, comparing this actual torque to a permitted torque of the internal combustion engine, and initiating an error response if the actual torque is at a predefined ratio to the permitted torque, wherein:
   for each partial injection, a fuel volume acting to generate a torque is determined;
   a total fuel volume of a combustion cycle is ascertained from a sum of each fuel volume acting to generate the torque; and
   the total fuel volume of the combustion cycle is taken into account for determining the fuel mass that is to be injected or that has been injected.

2. The method according to claim 1, wherein a fuel volume of a partial injection is determined, based on at least an actuation time of the pertinent final controlling element, and on the pressure acting on the fuel.

3. The method according to claim 1, wherein a fuel volume of a partial injection is determined based on at least an actuation time of the pertinent final controlling element and a variable characterizing the actuation start.

4. The method according to claim 2, wherein a total fuel volume of a combustion cycle is determined from the sum of the fuel volume of all partial injections.

5. The method according to claim 3, wherein a fuel mass is determined from the total fuel volume, using a fuel density (rho).

6. The method according to claim 4, wherein the fuel mass is linked to a wave correction mass to yield a corrected fuel mass.

7. The method according to claim 5, wherein a torque of the internal combustion engine is determined (21) on the basis of at least the corrected fuel mass and a rotational speed (n) of the internal combustion engine.

8. The method according to claim 6, wherein the determined torque of the internal combustion engine is linked to an efficiency correction factor to yield a corrected torque of the internal combustion engine.

9. The method according to claim 6, wherein the wave correction mass is determined on the basis of at least the fuel volume of the partial injections and of the pressure acting on the fuel.

10. The method according to claim 1, wherein the error response is initiated when the actual torque is greater than the permitted torque.

11. The method according to claim 2, wherein the determined fuel volume is corrected as a function of the start of actuation of the corresponding final controlling element.

12. The method according to claim 10, wherein a correction factor for correcting is taken from an injection efficiency characteristic map, which is a function of the actuation start.

13. The method according to claim 1 for monitoring a direct injection diesel engine.

* * * * *